United States Patent
Valva et al.

(10) Patent No.: US 10,578,019 B2
(45) Date of Patent: Mar. 3, 2020

(54) BOLT LUBRICATION

(71) Applicant: United Technologies Corporation, Farmington, CT (US)

(72) Inventors: Christopher M. Valva, Manchester, CT (US); David Barger, East Hartford, CT (US); Sean P. McGee, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 392 days.

(21) Appl. No.: 15/405,688

(22) Filed: Jan. 13, 2017

(65) Prior Publication Data
US 2019/0003389 A1 Jan. 3, 2019

(51) Int. Cl.
| | |
|---|---|
| *F02C 7/06* | (2006.01) |
| *F01D 25/18* | (2006.01) |
| *F16N 7/28* | (2006.01) |
| *F16N 11/04* | (2006.01) |
| *F16N 7/14* | (2006.01) |
| *F01D 25/24* | (2006.01) |

(52) U.S. Cl.
CPC .............. *F02C 7/06* (2013.01); *F01D 25/18* (2013.01); *F16N 7/14* (2013.01); *F16N 7/28* (2013.01); *F16N 11/04* (2013.01); *F01D 25/243* (2013.01); *F05D 2230/80* (2013.01); *F05D 2260/31* (2013.01); *F16N 2210/02* (2013.01)

(58) Field of Classification Search
CPC ... F02C 7/06; F01D 25/16; F16N 7/28; F16N 7/12; F16N 3/08; F16N 3/10; F16N 3/00; F16N 11/02; F16N 11/04; F16N 7/14
See application file for complete search history.

(56) References Cited

U.S. PATENT DOCUMENTS

| | | | | |
|---|---|---|---|---|
| 1,673,459 | A | * | 6/1928 | Jurad ...................... B60R 17/00 251/149.7 |
| 2,574,744 | A | * | 11/1951 | Koepke ................ B23Q 11/122 184/28 |
| 2,753,839 | A | | 7/1956 | Clark |
| 2,885,984 | A | | 5/1959 | Earnhart |
| 3,132,719 | A | | 5/1964 | Cole |
| 3,237,872 | A | | 3/1966 | Mincy |
| 3,944,025 | A | | 3/1976 | Owen |
| 4,811,818 | A | | 3/1989 | Jamison |
| RE34,391 | E | * | 9/1993 | Blake ...................... F16N 11/04 184/45.1 |
| 5,518,076 | A | | 5/1996 | Holz |
| 5,520,737 | A | * | 5/1996 | Denton .................... B05C 3/09 118/400 |

(Continued)

OTHER PUBLICATIONS

Wikipedia.org, "Screw Thread", available from <https://en.wikipedia.org/wiki/Screw_thread> on Nov. 29, 2016.

*Primary Examiner* — Michael R Mansen
*Assistant Examiner* — Robert T Reese
(74) *Attorney, Agent, or Firm* — Getz Balich LLC (57) ABSTRACT

Aspects of the disclosure are directed to a system comprising: a lubrication applicator device that includes: a base having a cavity that is configured to store a lubricant, and a plunger that is configured to seat a head of a bolt in a counterbore of the base, where the plunger is axially movable in the cavity and is configured to be at least partially recessed in the cavity to cause a side of the bolt to be immersed in the lubricant.

20 Claims, 8 Drawing Sheets

(56) References Cited

U.S. PATENT DOCUMENTS

| | | | |
|---|---|---|---|
| 5,565,242 A | 10/1996 | Buttrick, Jr. | |
| 5,743,359 A | 4/1998 | Parnell | |
| 6,520,292 B1 * | 2/2003 | Kurtz | F16C 33/6622 |
| | | | 184/28 |
| 8,701,591 B2 * | 4/2014 | Presley | A46B 11/00 |
| | | | 118/423 |
| 9,459,069 B1 * | 10/2016 | Campbell | F41B 5/143 |
| 2005/0194216 A1 | 9/2005 | Lin | |
| 2009/0057059 A1 * | 3/2009 | Wu | F16N 11/02 |
| | | | 184/5.1 |
| 2014/0090830 A1 * | 4/2014 | Maerz | E21B 33/068 |
| | | | 166/105 |
| 2015/0377412 A1 | 12/2015 | Dann | |

\* cited by examiner

BOLT LUBRICATION

BACKGROUND

Gas turbine engines, such as those which power aircraft and industrial equipment, employ a compressor to compress air that is drawn into the engine and a turbine to capture energy associated with the combustion of a fuel-air mixture. Bolts are used on various portions/sections of an engine. For example, bolts are used to join engine case structures (or other components) to one another.

From time-to-time, one or more portions/sections of an engine may need to be disassembled. Such disassembly may be a part of routine/scheduled maintenance/inspection activities and/or may be undertaken to facilitate one or more repairs. In order to enable such disassembly, an anti-seize compound/lubricant (which is typically made of a metal material or a carbon-type of paste) is applied to a bolt prior to the assembly of the engine. The lubricant reduces friction between the bolt and a component (e.g., a flange) that the bolt mates to in order to ensure ease of assembly and to aid in the removal of the bolt during disassembly.

Figure 2:
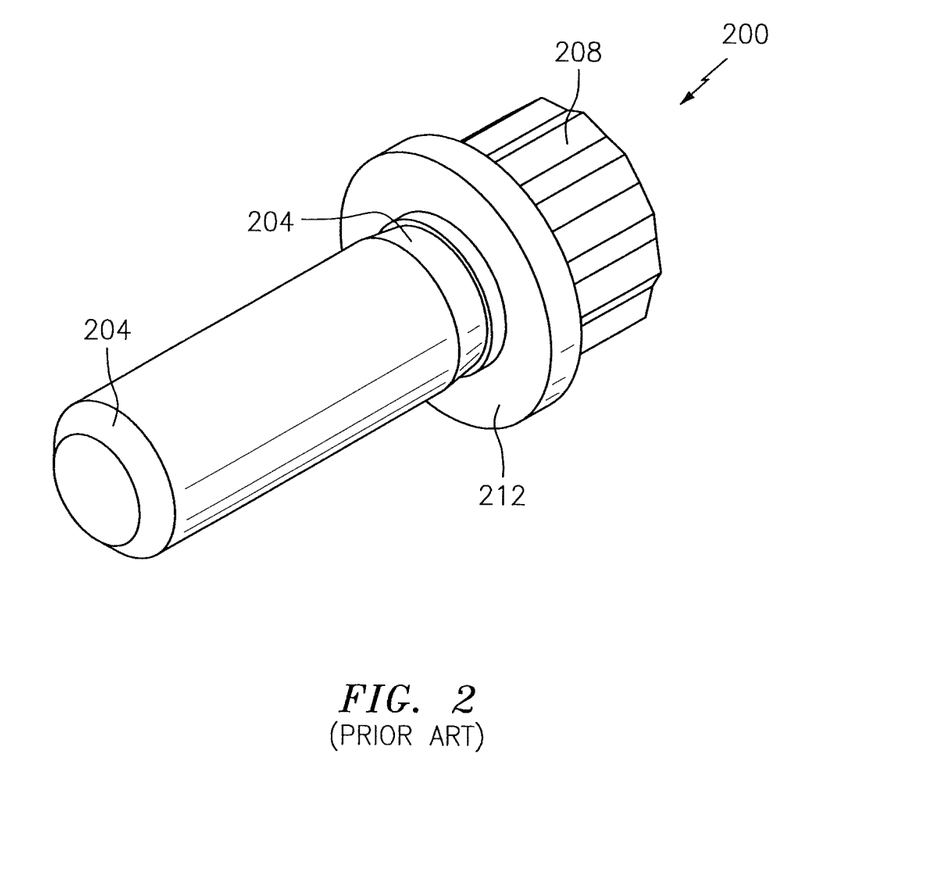
FIG. 2 illustrates a bolt in accordance with the prior art.

Referring to FIG. 2, a bolt 200 in accordance with the prior art is shown. The bolt 200 includes one or more threaded sections 204 and a head 208 with a thrust/washer face 212. To be effective, the lubricant is applied to at least the threaded sections 204 and the thrust face 212 of the bolt 200. A technician/mechanic typically uses a brush to apply the lubricant to the bolt 200. The application of the lubricant is time intensive and laborious. Moreover, the quality of the application is prone to variation, due at least in part to differences in technician training and experience.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system comprising: a lubrication applicator device that includes: a base having a cavity that is configured to store a lubricant, and a plunger that is configured to seat a head of a bolt in a counterbore of the plunger where the plunger is axially movable in the cavity and is configured to be at least partially recessed in the cavity to cause a side of the bolt to be immersed in the lubricant. In some embodiments, the system further comprises the bolt. In some embodiments, the system further comprises the lubricant. In some embodiments, the plunger includes at least one aperture in the counterbore that is configured to convey the lubricant to a thrust face of the bolt. In some embodiments, the counterbore is configured to pool the lubricant. In some embodiments, the plunger includes at least one of a hole, a brush, or a squeegee that is configured to remove lubricant from the side of the bolt upon a withdrawal of the bolt from the lubrication applicator device. In some embodiments, the at least one of a hole, a brush, or a squeegee is sized to strip away excess lubricant from threads of the bolt that radially exceed a crest of the threads. In some embodiments, the lubrication applicator device includes a spring-loaded ejector pin that is configured to aid in a withdrawal of the bolt from the lubrication applicator device. In some embodiments, the plunger includes at least one aperture that is configured to convey lubricant towards an end of the plunger, and the system further comprises a cap configured to cover the at least one aperture. In some embodiments, the cap is disposed between the cavity and a thrust face of the bolt. In some embodiments, the plunger is spring-loaded via at least one spring. In some embodiments, the system further comprises a seal disposed between the base and the plunger.

Aspects of the disclosure are directed to a method of lubricating a bolt, comprising: inserting the bolt into a plunger of a lubrication applicator device, depressing at least one of the bolt or the plunger to apply lubricant stored in the lubrication applicator device to a side of the bolt, and withdrawing the bolt from the plunger. In some embodiments, the depressing causes lubricant to exit at least one aperture of the plunger. In some embodiments, the lubricant that exits the at least one aperture lubricates a thrust face of the bolt. In some embodiments, the withdrawing of the bolt from the plunger causes lubricant to be removed from the side of the bolt. In some embodiments, the side of the bolt includes a threaded section of the bolt.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Figure 1:
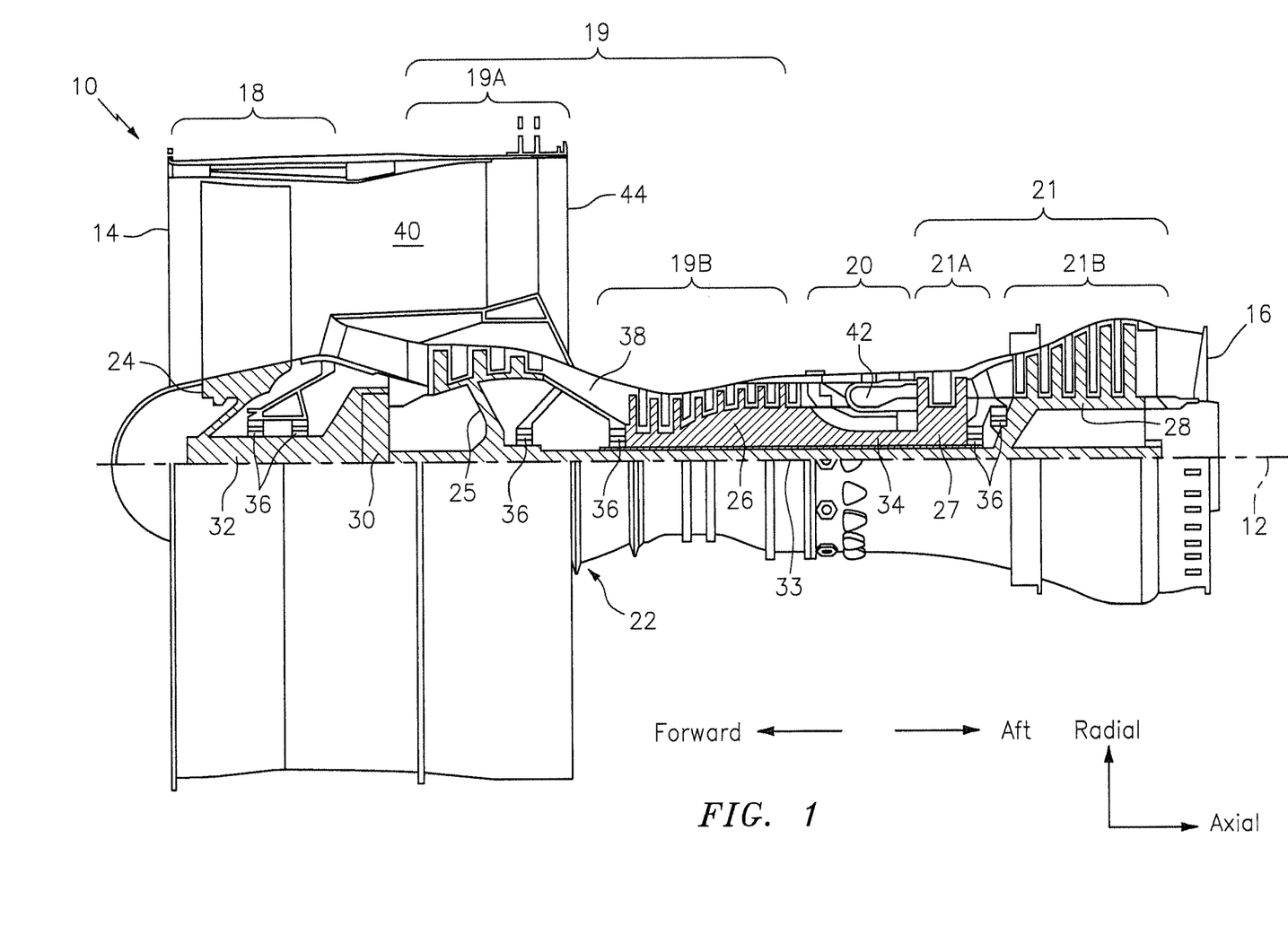
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

As described above, a lubricant is typically applied to one or more bolts used in an engine (e.g., engine 10 of FIG. 1) prior to the bolt being installed on the engine. To the extent that a bolt is removed from the engine and then reinstalled, lubricant may be reapplied to that bolt prior to the reinstallation.

Figure 3:
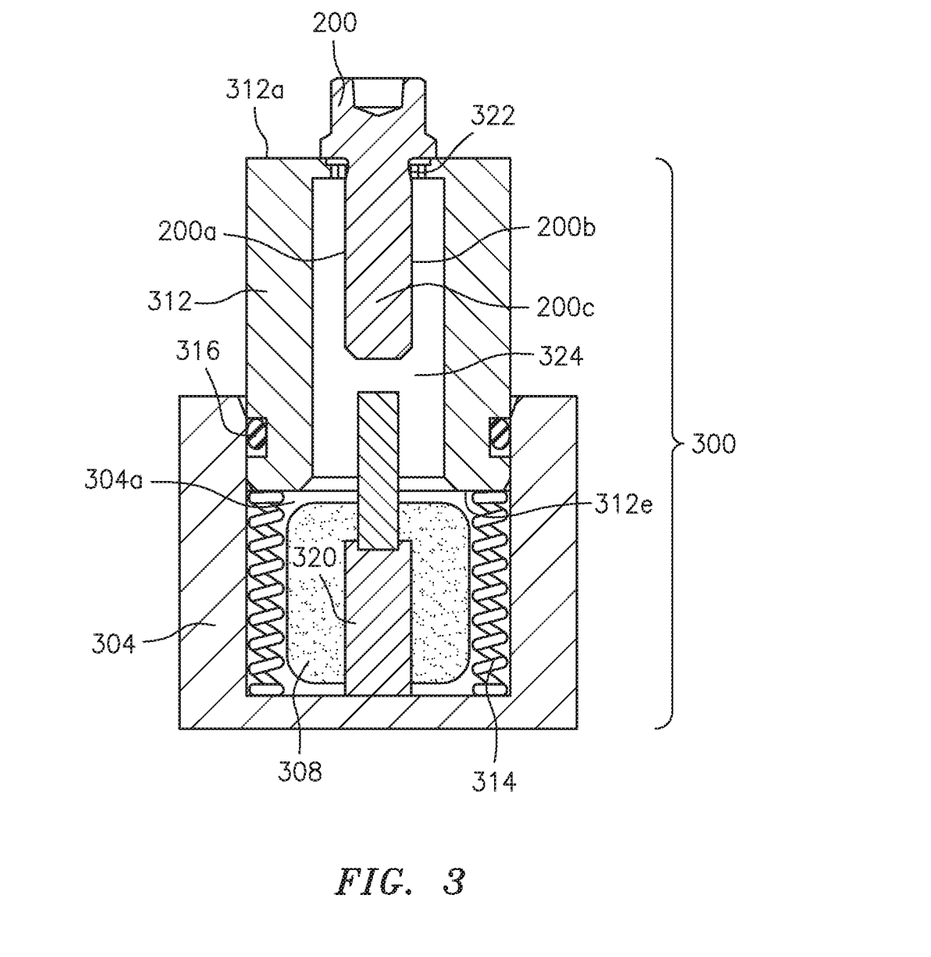
FIG. 3 illustrates a bolt and a lubrication applicator device in accordance with aspects of this disclosure.

Referring to FIG. 3, a bolt 200 (see FIG. 2) is shown seated in a lubrication applicator device 300. The device 300 may include a base 304 that defines/forms a cavity 304a. The cavity 304a may store a lubricant 308. The device 300 may include a plunger 312 (that may be spring-loaded via one or more springs 314) that may be configured to seat the bolt 200. The device 300 may include a seal 316. In some embodiments, the device 300 may include a spring-loaded ejector pin 320. The pin 320 may aid in the withdrawal of the bolt 200 from the device 300 once the bolt 200 has been lubricated as described further below.

In some embodiments, the base 304 and the plunger 312 may be made of one or more materials. For example, a plastic material may be used to provide transparency/visibility in regards to the lubricant 308 that is stored in the cavity 304a. In some embodiments, the base 304 and/or the plunger 312 may be made of a metal.

Figure 4:
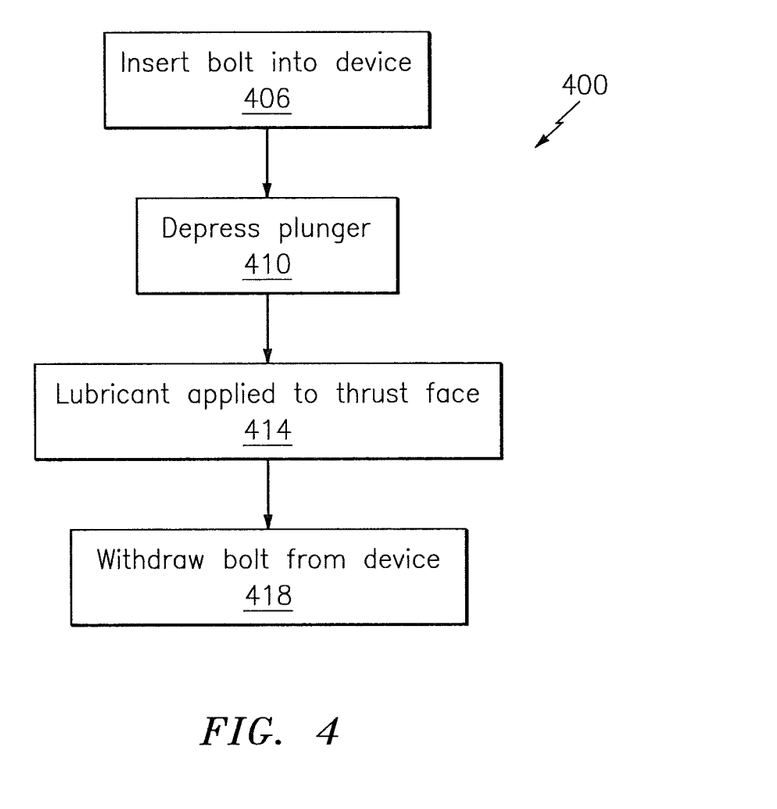
FIG. 4 illustrates a flow chart of a method for lubricating a bolt in accordance with aspects of this disclosure.

Referring to FIG. 4, a flowchart of a method 400 used in lubricating a bolt is shown. The method 400 is described below in relation to the bolt 200/device 300 of FIGS. 3 and 7 for the sake of illustrative convenience. One skilled in the art would appreciate that the method 400 may be adapted to accommodate bolts and/or devices other than the bolt 200 and the device 300.

In block 406, a technician may insert the bolt 200 into the device 300. For example, as part of block 406 the bolt may be inserted into the plunger 312 via a hole 322.

Figure 7:
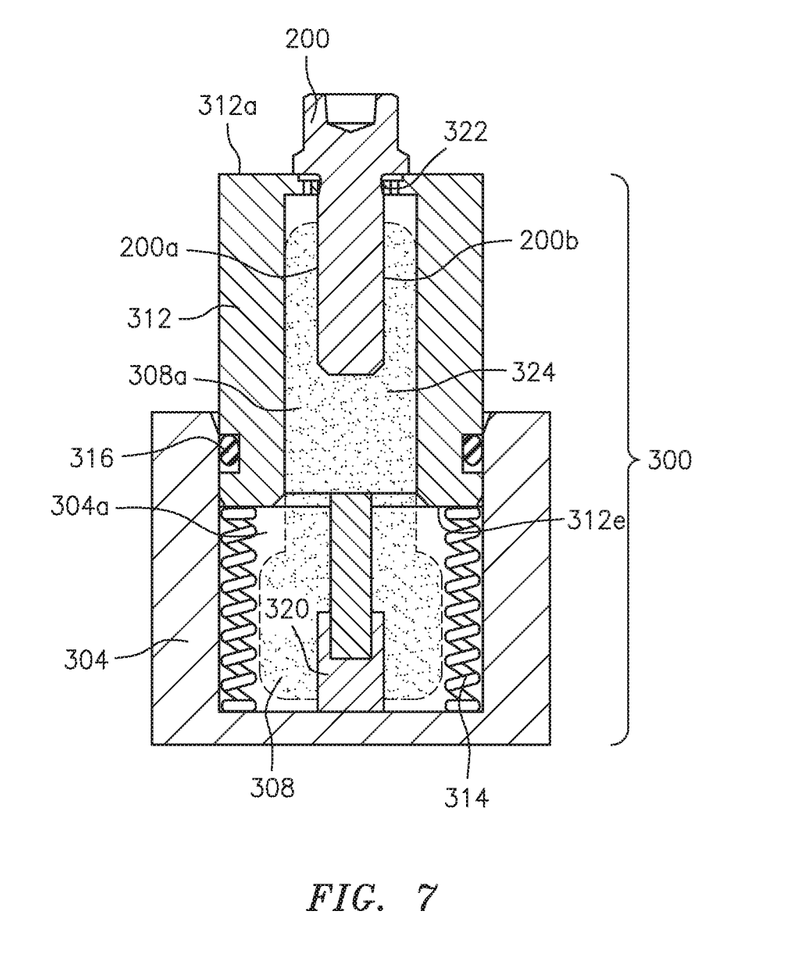
FIG. 7 illustrates a displacement of lubricant around the sides of a bolt when a plunger is depressed in accordance with aspects of this disclosure.

In block 410, the plunger 312 (or analogously, the bolt 200) may be recessed/depressed axially (further) into the cavity 304 a towards the stored lubricant 308. The depression of the plunger 312 may cause at least a portion 308a of the lubricant 308 to flow into a channel 324 of the plunger 312 and to flow up-and-around the sides (e.g., sides 200a, 200b) of the bolt 200 as shown in FIG. 7, where the sides may include the threaded sections 204 (see FIG. 2). The channel 324 may extend axially through the plunger 312 from an inner axial surface 312e of the plunger 312. The seal(s) 316 may prevent the lubricant from escaping the device 300 in the area/region between the base 304 and the plunger 312.

Figure 5:
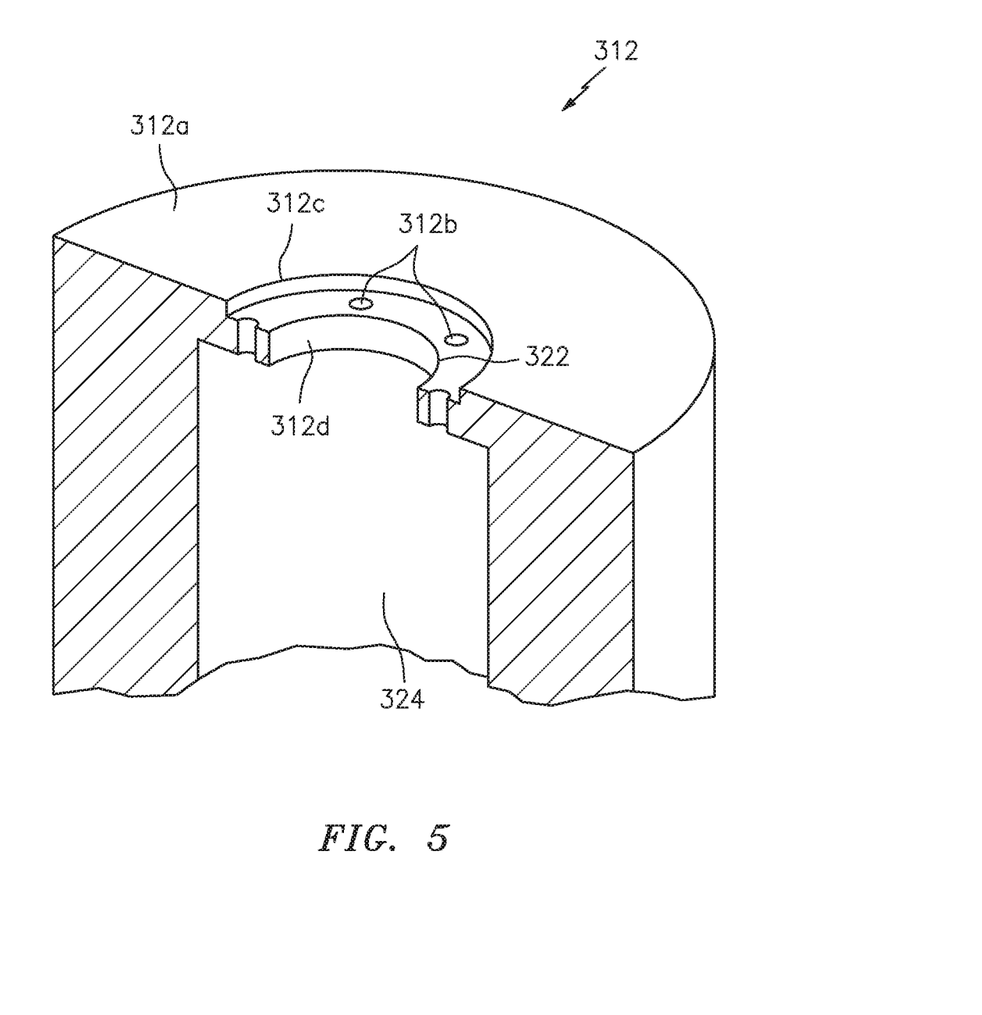
FIG. 5 illustrates a plunger of a lubrication applicator device in accordance with aspects of this disclosure.

In block 414, the lubricant that flows up-and-around the sides of the bolt 200 in block 410 may continue until reaching an outer axial surface 312a (e.g., an end/top) of the plunger 312 that is furthest removed from the cavity 304a. One or more apertures/holes 312b (see FIG. 5) formed in/proximate the outer axial surface 312a of the plunger 312 may allow the lubricant to flow from the channel 324 into a counterbore 312c (see FIG. 5) under the thrust face 212 (see FIG. 2) of the bolt 200 to lubricate the thrust face 212. The counterbore 312c may form a face/surface for seating a head (e.g., head 208—see FIG. 2) of the bolt 200 and may pool at least a portion of the lubricant that exits the apertures 312b to lubricate the thrust face 212. The hole 322 may be centered in the counterbore 312c and extend axially through the plunger 312 from the counterbore 312c to the channel 324. The one or more apertures 312b may be disposed within the counterbore 312c radially outside of the hole 322.

In block 418, the bolt 200 may be withdrawn from the device 300 (e.g., the plunger 312). The withdrawal may be brought about by a lessening/cessation of the force that was used in depressing the plunger 312/bolt 200 as part of block 410. The spring-loaded ejector pin 320 may aid in the removal of the bolt 200 from the device 300. A close tolerance hole (e.g., the hole 322), brush, or squeegee (one or more of which are denoted by reference character 312 d in FIG. 5) at/proximate the end. 312a of the plunger 312 may be used to remove/strip any excess lubricant (e.g., lubricant in an amount greater than a threshold) from the bolt 200 (e.g., the sides 200a, 200b) upon the withdrawal of the bolt 200 from the device 300. To the extent that a squeegee 312d is included, the squeegee 312d may be made of one or more materials, such as for example a rubber material, a synthetic material, etc.

Figure 8:
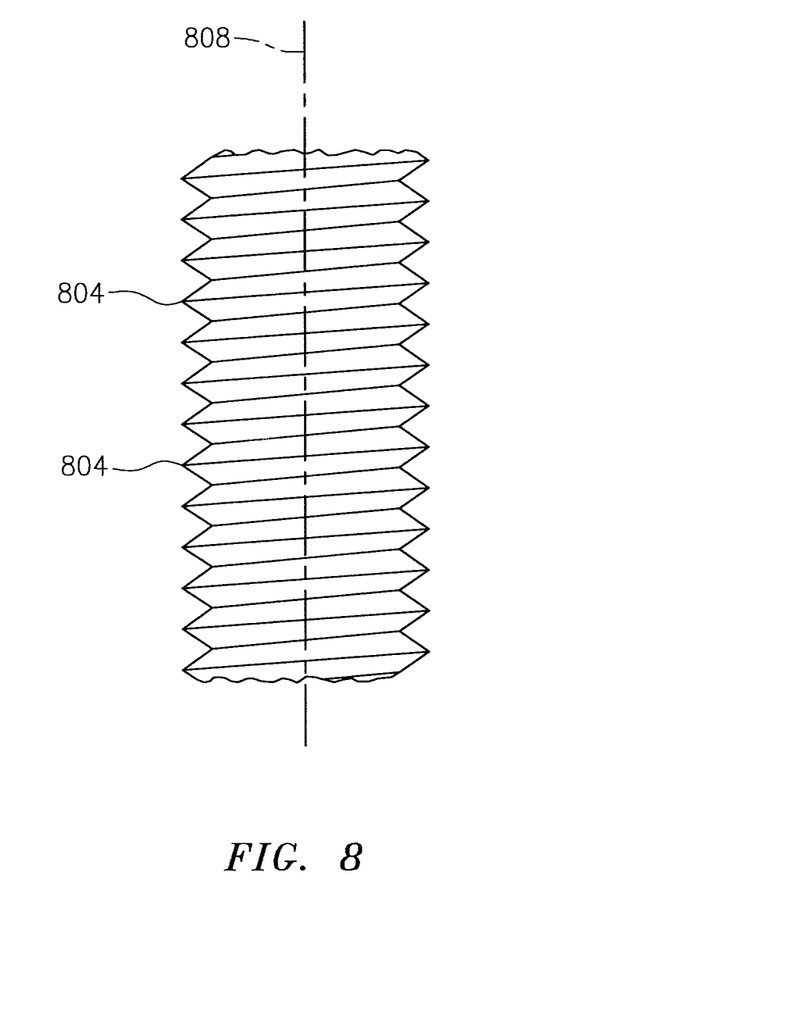
FIG. 8 illustrates a threaded section of a bolt, including crests of threads, in accordance with aspects of this disclosure.

The hole/brush/squeegee 312d that may be used may be sized to be larger than a diameter of a stem 200c the bolt 200 to facilitate insertion and removal of the bolt 200. For example, in some embodiments the hole/brush/squeegee 312d may have a diameter that is approximately 0.4% larger than the maximum diameter of the stem 200c of the bolt 200. Other values for the size/diameter of the hole/brush/squeegee 312d relative to the size/diameter of the bolt 200 may be used. In some embodiments, the hole/brush/squeegee 312d may be sized/selected so as to strip away any excess lubricant from the threads 204 (see FIG. 2) that radially exceeds one or more crests 804 (see FIG. 8) of the threads 204 relative to a longitudinal axis 808 of the bolt.

The method 400 is illustrative. In some embodiments, one or more of the blocks/operations (or one or more portions thereof) may be optional. Additional blocks not shown may be included. The blocks may execute in an order/sequence that is different from what is shown in FIG. 4.

In some embodiments, a form factor for one or more components of the device 300 may vary based on an application environment in which the device 300 is used. For example, a multitude of different types of plungers 312 may be provided, where a first of the plungers 312 may accommodate/seat a bolt of a first size/dimension and a second of the plungers 312 may accommodate/seat a bolt of a second size/dimension, where the first size/dimension may be different from the second size/dimension. In this manner, a common base 304 may be utilized irrespective of the size/dimension of the bolt that is accommodated/seated by the plunger 312.

In some embodiments, the plunger 312 includes a slip-fit into the base 304 for purposes of retaining the plunger 312 relative to the base 304. Other techniques for retaining the plunger 312 with respect to the base 304 may be used. For example, a step/protrusion may be added to the plunger 312, and a retaining nut may be added to the base 304 to keep the parts from separating when the plunger 312 is released.

In some embodiments, a cap/plug (see FIG. 6—cap 612) may be added to the plunger 312 when, e.g., the device 300 is not in use. For example, the cap 612 may cover the apertures 312b (see FIG. 5) in order to prevent stored lubricant 308 (see FIG. 3) from exiting/emerging from the apertures 312b when, e.g., the device 300 is in transit or when the device 300 is (inadvertently) tipped over. One or more retention mechanisms (e.g., an adhesive, a screw, etc.) may be incorporated as part of the cap 612 in order to secure the cap 612 to the plunger 312 (e.g., the counterbore 312c).

Figure 6:
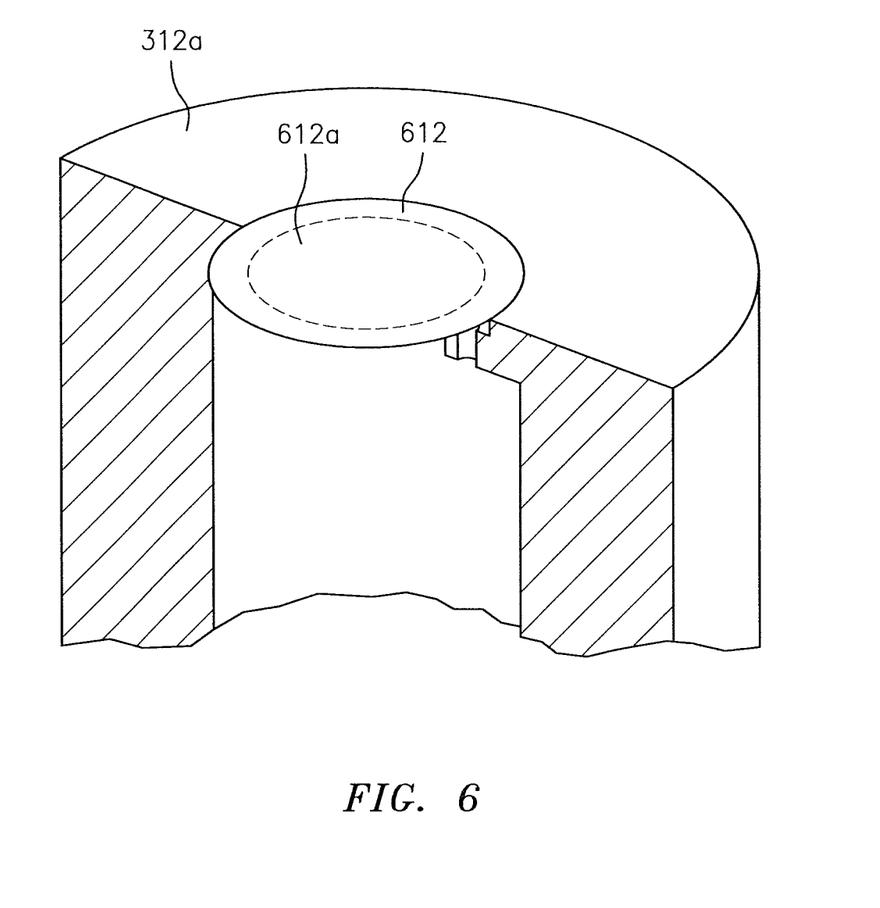
FIG. 6 illustrates a cap and a plunger of a lubrication applicator device in accordance with aspects of this disclosure.

In some embodiments, a cap/plug may be used to close/seal-off the apertures 312b even when the device 300 is in use. For example, in some embodiments it might not be desirable to lubricate a thrust face (see FIG. 2—thrust face 212) of a bolt, such as for example in an application where a bolt is used with a nut. In this respect, even in use as part of lubricating a bolt, a cap/plug may be disposed between, e.g., the cavity 304a and the thrust face. Referring to FIG. 6, the portion of the cap 612 that is inside of the circle 612a may be omitted in such embodiments to enable the insertion and removal of the bolt 200 from the device 300 yet still close/seal-off the apertures 312b.

Technical effects and benefits of this disclosure include an ability to streamline an application of a lubricant to a bolt. For example, aspects of this disclosure provide an ability to quickly and repeatedly apply lubricant to bolts on, e.g., an assembly floor, saving both time and money while ensuring that the bolts are adequately/properly lubricated.

While some of the examples described herein relate to providing a lubricant to a component (e.g., a bolt), aspects of the disclosure may be used to provide any type of fluid (e.g., any type of liquid) to a component. Examples of such fluids may include hydraulic fluid, fuel (e.g., gasoline), refrigerant, etc.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system comprising:
   a lubrication applicator device that includes:
   a base having a cavity that is configured to store a lubricant; and
   a plunger having an inner axial surface disposed within the base and an outer axial surface disposed outside the base, the plunger comprising a counterbore disposed through the outer axial surface, the plunger configured to seat a head of a bolt on a rim of the counterbore, the plunger further having a channel extending axially through the plunger from the inner axial surface and a hole centered in the counterbore and extending axially through the plunger from the counterbore to the channel;
   wherein the plunger is axially movable in the cavity and is configured to be at least partially recessed in the cavity to cause a side of the bolt to be immersed in the lubricant, with a stem of the bolt being placed through the hole into the cavity; and
   wherein the plunger includes a plurality of apertures extending through the plunger between the counterbore and the channel, the plurality of apertures radially spaced from the hole and circumferentially spaced from one another about the hole.

2. The system of claim 1, further comprising the bolt.

3. The system of claim 1, further comprising the lubricant.

4. The system of claim 1, wherein the counterbore is configured to pool the lubricant.

5. The system of claim 1, wherein the plunger includes at least one of a hole, a brush, or a squeegee that is configured to remove lubricant from the side of the bolt upon a withdrawal of the bolt from the lubrication applicator device.

6. The system of claim 5, wherein the at least one of a hole, a brush, or a squeegee is sized to strip away excess lubricant from threads of the bolt that radially exceed a crest of the threads.

7. The system of claim 1, wherein the lubrication applicator device includes a spring-loaded ejector pin that is configured to aid in a withdrawal of the bolt from the lubrication applicator device.

8. The system of claim 1 further comprising a cap configured to cover the plurality of apertures.

9. The system of claim 8, wherein the cap is disposed between the cavity and a thrust face of the bolt.

10. The system of claim 1, wherein the plunger is spring-loaded via at least one spring.

11. The system of claim 1, further comprising:
a seal disposed between the base and the plunger.

12. The system of claim 1, wherein the hole is configured to remove lubricant from the side of the bolt upon a withdrawal of the bolt from the lubrication applicator device.

13. The system of claim 1, wherein the plunger further comprises a plunger portion axially disposed between the channel and the counterbore and wherein the plurality of apertures extend through the plunger portion between the channel and the counterbore.

14. The system of claim 1, wherein the counterbore is defined by a base surface of the plunger, axially spaced from the outer axial surface of the plunger, and a perimeter surface of the plunger extending between the base surface and the outer axial surface.

15. A method of lubricating a bolt, comprising:
inserting the bolt into a plunger of a lubrication applicator device and seating a head of the bolt on an outer rim of a counterbore disposed through an outer axial surface of the plunger;
depressing at least one of the bolt or the plunger to apply lubricant stored in a cavity of the lubrication applicator device to a side of the bolt; and
withdrawing the bolt from the plunger;
wherein the plunger has a channel extending axially through the plunger from the cavity and a hole centered in the counterbore and extending axially through the plunger from the counterbore to the channel; and
wherein the plunger includes a plurality of apertures extending through the plunger between the counterbore and the channel, the plurality of apertures radially spaced from the hole and circumferentially spaced from one another around the hole where a stem of the bolt is placed through the hole of the counterbore.

16. The method of claim 15, wherein the depressing causes lubricant to exit the plurality of apertures of the plunger.

17. The method of claim 16, further comprising lubricating a thrust face of the bolt with the lubricant that exits the plurality of apertures.

18. The method of claim 15, wherein the withdrawing of the bolt from the plunger causes lubricant to be removed from the side of the bolt.

19. The method of claim 15, wherein the side of the bolt includes a threaded section of the bolt.

20. The method of claim 15, wherein the plunger further comprises a plunger portion axially disposed between the channel and the counterbore and wherein the plurality of apertures extend through the plunger portion between the channel and the counterbore.

\* \* \* \* \*